United States Patent
Guillouard et al.

(10) Patent No.: US 7,348,924 B2
(45) Date of Patent: Mar. 25, 2008

(54) METHOD OF POSITIONING THE ANTENNAS OF A DATA TRANSMISSION SYSTEM

(75) Inventors: Samuel Guillouard, Chantepie (FR); Vincent Demoulin, Montfort sur Meu (FR); Olivier Mocquard, Rennes (FR); Eric Auffret, Noyal sur Vilaine (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 11/417,841

(22) Filed: May 3, 2006

(65) Prior Publication Data

US 2006/0258402 A1 Nov. 16, 2006

(30) Foreign Application Priority Data

May 13, 2005 (FR) .................................. 05 51260

(51) Int. Cl.
*G01S 5/04* (2006.01)
(52) U.S. Cl. ...................... 342/432; 342/437
(58) Field of Classification Search ............... 342/432, 342/434, 437, 450; 455/562.1
See application file for complete search history.

(56) References Cited

U.S. PATENT DOCUMENTS

| | | | | |
|---|---|---|---|---|
| 4,101,836 A | * | 7/1978 | Craig et al. | ............... 455/277.1 |
| 4,317,229 A | * | 2/1982 | Craig et al. | ............... 455/277.1 |
| 6,167,036 A | * | 12/2000 | Beven | ........................ 370/331 |

FOREIGN PATENT DOCUMENTS

| | | |
|---|---|---|
| EP | 1394896 | 3/2004 |
| WO | WO02/43276 | 5/2002 |

OTHER PUBLICATIONS

Search report dated Jan. 19, 2006.

* cited by examiner

*Primary Examiner*—Dao Phan
(74) *Attorney, Agent, or Firm*—Joseph J. Laks; Robert D. Shedd; Brian J. Cromarty

(57) ABSTRACT

The invention pertains to a method of positioning antennas with sectorization in a data transmission system. The method makes it possible to search, by successive approximations, for the sector of each antenna allowing optimal reception of the information. The search step is repetitive.

7 Claims, 2 Drawing Sheets imum threshold level

METHOD OF POSITIONING THE ANTENNAS OF A DATA TRANSMISSION SYSTEM

This application claims the benefit, under 35 U.S.C. § 119 of French Patent Application 0551260, filed May 13, 2005.

BACKGROUND OF THE INVENTION

1. Field of the Invention

The invention pertains to data transmission in a wireless radiocommunication system comprising a plurality of antennas. It relates to a method of positioning the antennas of the system.

Known among wireless communication systems are data transmission systems with plural antennas operating inside buildings, indoor areas, or operating in semi-enclosed areas. These communication systems are generally composed of a base station and of several mobile terminals. Standards such as Hiperlan2 and IEEE802.11a define such communication systems operating in frequency bands situated in the vicinity of 5 GHz.

Such systems also find an application in high-definition wireless cameras.

The quality of the data transmission between base station and mobile terminals depends mainly or particularly on the antenna system used for the emission and the reception of the data. The energy transmitted during reception must be maximized so as to render the link effective and reduce the energy demands, a significant point for any user not having a fixed energy source. This is why the optimization of the reception by antennas is a significant point in the development of transceivers.

To increase the resistance to noise and to echos of these transmission systems, it is known to diversify the antennas, that is to say to carry out MRC (standing for Maximum Ratio Combining) multiantenna processing. The antenna diversity consists in multiplying the number of antennas and therefore the transmission paths of the waves so that the antennas are not subject to the same echo constraints and in combining the signals received from the various antennas. It therefore allows better stability by eradicating the untimely fading which often characterizes single-antenna solutions.

Among the antenna techniques also used to increase the range of a radio system, sectorization is certainly one of the most widespread. It consists in having available several beams each affording a different angular coverage. The radio system adjusts the choice of the sector as a function of the position of the emission and reception equipment.

2. Description of the Prior Art

These two techniques, that is to say antenna diversity and sectorization, are not antinomic. Specifically, known from document US 2004/0196834 is a system for wireless transmission comprising a plurality of antennas with sectorization in such a way that the transmission of the data is effected by at least one selected antenna sector. At each new selection, a new antenna sector is chosen and an instantaneous toggling takes places. This signifies that the radio link passes from one sector of an antenna to another sector of another antenna abruptly. This abrupt transition gives rise to a major risk of occurrence of error and possibly the momentary loss of the link.

To remedy this problem the invention proposes that the signals received by the assembly of antennas be combined, whatever the sector to which they belong.

SUMMARY OF THE INVENTION

The invention consists in effecting so-called soft sectorization by toggling only one antenna at a time from one sector to the other by successive steps, thus making it possible to permanently maximize the level of the signal received.

The invention offers the advantage of great stability. The larger the number of antennas the lower the risk taken during the toggling of an antenna.

The invention relates to a method of positioning antennas of a data transmission system comprising a system combining several antennas (N) with sectorization (M sectors). Each antenna operating according to a defined sector, the method comprises an initialization step and a repetitive step of searching, by successive approximation, for the sector of each antenna allowing optimal reception of the information.

An initialization step consists in identifying the antennas concerned, in determining a selection parameter and in arbitrarily choosing a sector for each of the antennas concerned.

Preferably, the identification of the antennas is done by numbering each antenna and the selection parameter is the power received or the "signal-to-noise and interferers" ratio of the signal received.

Preferably, the step of searching for the sector of each antenna allowing optimal reception of the information comprises the steps of measuring the selection parameter received by each of the N antennas for a given sector, of comparing these N parameters and identifying the antenna whose parameter is the lowest and of changing the sector of this antenna until a maximum level of the parameter received is obtained. The step of searching for the sector of each antenna takes place with the dispatch of each new data frame.

Preferably, a minimum threshold of the selection parameter is fixed so as to be able to deselect the antenna whose selection parameter does not exceed this threshold.

According to another aspect of the invention, for a situation defined as stable for an antenna, when the parameter received for all the sectors of this antenna is less than the parameters received by the other antennas, the recurrence of the step of searching for the sector of each antenna is reduced.

This method also applies to any system combining N antennas with different polarizations (M polarizations).

BRIEF DESCRIPTION OF THE DRAWINGS

The invention will be better understood, and other features and advantages will appear on reading the description which follows, the description making reference to the appended drawings among which.

DESCRIPTION OF THE PREFERRED EMBODIMENTS

Figure 1:
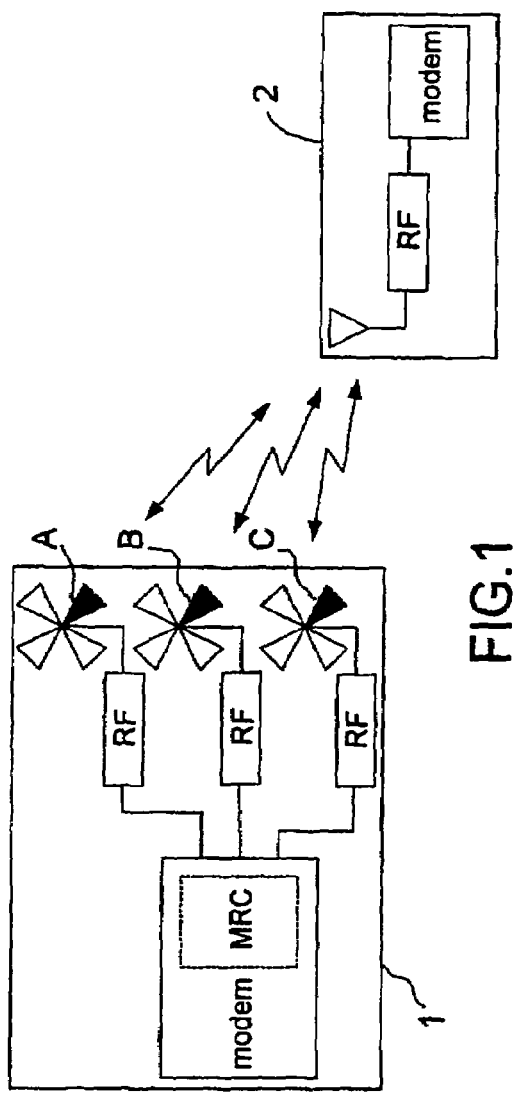
FIG. 1 represents an example of a transceiver comprising a system with plural antennas used for the invention.

FIG. 1 represents an emitter/receiver comprising a system with plural antennas used for the invention. It comprises a base station 1 and, in this example, a single mobile terminal 2.

The base station 1 comprises a plurality of antennas with sectorizations: a first antenna A, a second B and a third C. These three antennas comprise in this example four sectors each. They can emit signals towards the mobile terminal and receive, in combination, signals from the mobile terminal. These antennas A, B and C are linked by way of an RF (Radio Frequency) circuit to an MRC (Maximum Radio Combining) multiantenna processing modem. The MRC technique consists in computing at the level of the receiver of the base station the consistent and weighted sum of the equalized signals received by each of the antennas. This technique of combining the signals received makes it possible to obtain maximum possible reception.

The mobile terminal 2 is equipped, in the present example, with a single antenna for the transmission of the data. This antenna is linked, as is known in the state of the art, to a modem by way of RF circuits.

Figure 2:
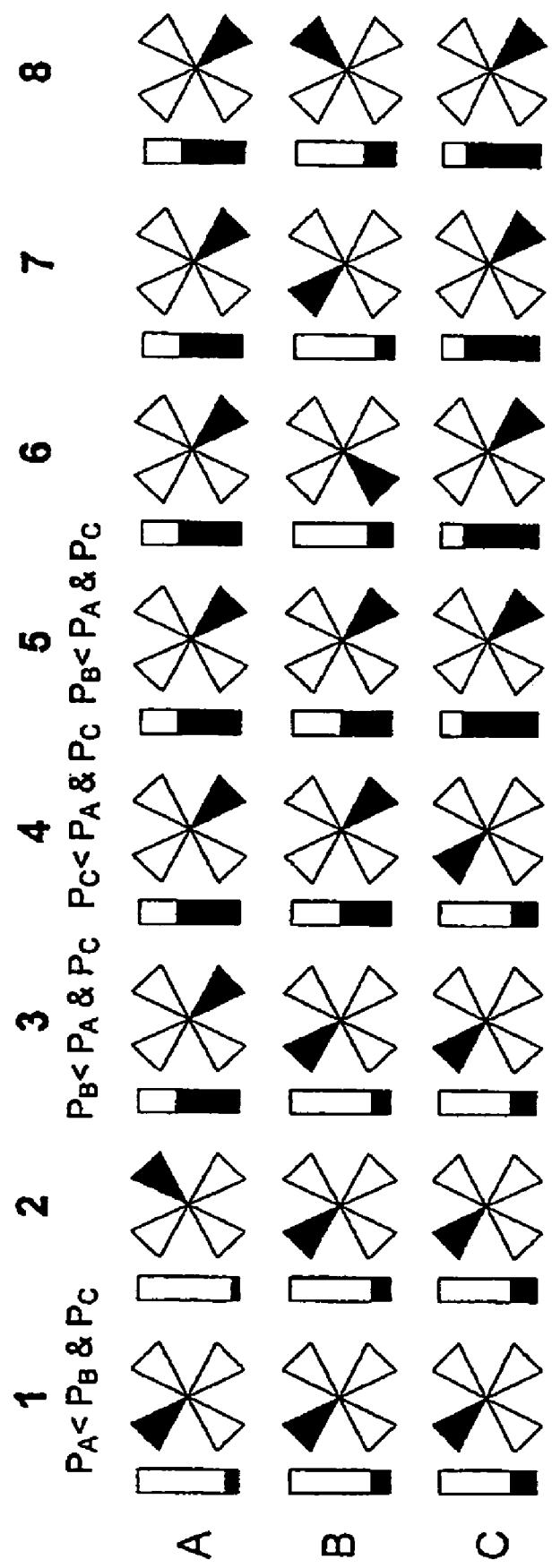
FIG. 2 represents an example of the method according to the invention allowing the selection of the antennas and the choice of the sectors of each antenna of the system according to FIG. 1

The method allowing the operation of the antenna system, that is to say the selection of the antennas and the choice of the sector of each antenna thus allowing optimal reception, is made explicit with the aid of FIG. 2.

The 3 antennas A, B and C are symbolized by the assembly of their component sectors. In the example of FIG. 2, antennas with 4 sectors are involved but the method according to the invention relates to antennas with M sectors. The selected sector is identified in bold. They form part of a system with plural antennas such as is represented in the previous figure.

Associated with each antenna is a rectangle representing the level of a quality criterion or selection parameter. The latter may be, for example, the level of the power P received by the antenna, as in the example proposed according to FIG. 2. It may also correspond to the "signal-to-noise and interferers" ratio. The noise and the interferers are disturbances of the signal, this is why the disturbances due to the interferer signals are associated with the disturbances due to the noise in the ratio determining the quality of the signal. The optimal criterion would be a parameter calculated on the basis of the measurement of the power and of the signal-to-noise ratio. The function of the parameter is to make it possible to measure the quality of reception of the antenna and must also make it possible to choose the antenna whose absence will have the least impact on the quality of the link. Any other parameter addressing these functions of reliability of the signal on the reception channel or in relation to the signal obtained on the basis of the combination of the N−1 signals arising from the other N−1 antennas will therefore be accepted for qualifying the antenna N.

The value of this parameter is entered for each antenna positioned on a certain sector. In our example this involves the power P received. These parameters arising from all the antennas A, B, and C are thereafter compared.

Eight steps (numbered from 1 to 8) are represented so as to make it possible to understand the method according to the invention. The principle of the method is the search for the maximum signal reception level on each antenna so as to maximize the combination of the signals received on all the antennas by the MRC system.

For the first step, termed the initialization step, the same sector is chosen arbitrarily for all the antennas (sector 1).

The level of the power received Pa, Pb and Pc by each antenna A, B and C respectively is measured, then these levels are compared. In the present case, the level of the power received by antenna A is less than those received by antennas B and C respectively: $Pa \leq Pb$ & $Pc$. Antenna A being the one whose power level P is the lowest, another sector of antenna A must therefore be tested. There is therefore toggling for antenna A from sector 1 to sector 2. It should be noted that this is the least influential antenna of the reception system which will therefore change sector. Its influence on the signal received is minimum and the disturbance will be minimal.

The second step shows that, antenna A having toggled to the second sector, the power level Pa received by antenna A is still lower than that Pb and Pc received by antennas B and C. Accordingly there is again toggling for antenna A from sector 2 to sector 3.

The measured power of antenna A sector 3 is greater than those of antennas B and C. In the course of the third step, it is antenna B whose power level is less than the others which will be made to toggle from the first sector to the second.

In the course of steps 4 and 5 antennas C and B are made to change sector in an identical manner.

In the course of steps 6, 7 and 8, the power received for antenna B remains less than those of antennas A and C. The situation is then termed stable.

It will be noted that the switch from step 1 of initialization to step 5 of maximum power received is performed by 4 successive sector togglings of antenna A then of B and finally of C. The result is therefore a change of antenna sectors which is done softly by successive togglings. The change of sector is done without being detrimental to the quality of the radio link.

If the communication is composed of successive data frames, the measurement of the power and the change of sector of an antenna can be triggered by the change of frame or take place during an interval reserved at the start of a frame. If, for example, a frame is emitted every 10 ms, the switch from step 1 to step 8, corresponding to a situation termed stable, will be made in 80 ms.

The method envisages a solution for certain cases of instance (not represented) in the course of the steps of FIG. 2. In the course of the initialization step the antennas are identified and ordered. A priority of one antenna over the other is thus established in such a way that if two antennas receive an equal power lower than the third, the one whose sector will change is determined.

A minimum threshold of power received is also envisaged. Specifically if the power received by an antenna does not exceed this threshold during a certain number of steps, it is regarded as not responding. It is thus disabled for the desired communication. On condition that it is not defective, it is freed so as possibly to be reused to form with other antennas another system with plural antennas. Such selection of antennas can take place downstream of the demodulation chain in a data reception system.

The system self adjusts permanently, that is to say the antenna receiving the lowest power is always in search of a more favourable sector. From the moment at which a stable situation is attained, the occurrence of the measurements is reduced.

In another way the system can self adjust, being limited to a permanent search for a more favourable sector, neighbouring the sector selected, for each antenna successively.

Figure 3:
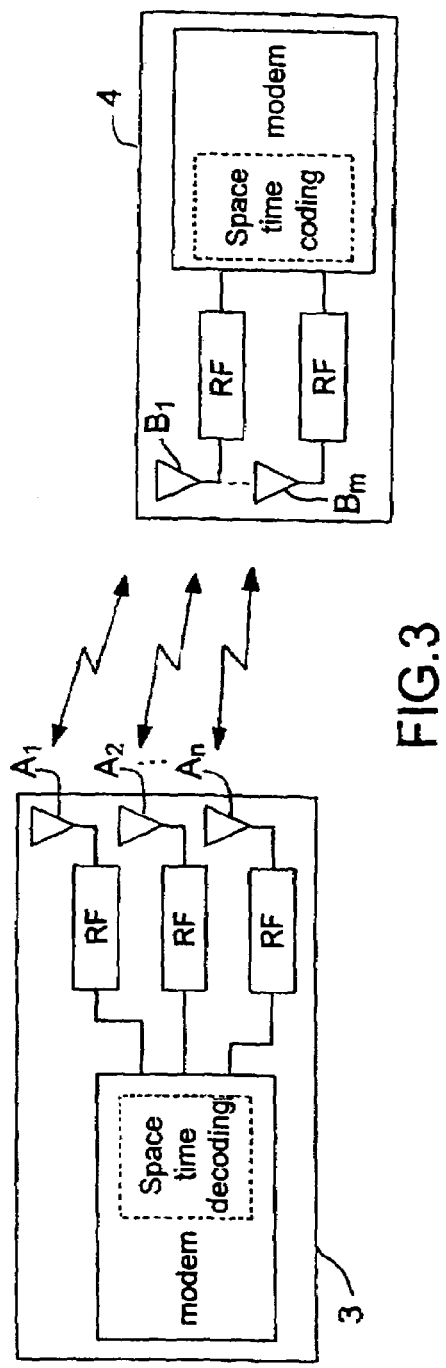
FIG. 3 represents an emitter/receiver of MIMO type with plural antennas used for the invention.

FIG. 3 represents a system with plural antennas of MIMO (Multiple Input, Multiple Output) type which has available several reception chains, used for the invention. Different spatial data streams are transmitted to the various reception chains. It is possible that these streams represent the components of one and the same signal.

It comprises, as in the previous example, a base station 3 comprising a system with plural antennas A1, A2 . . . An, linked to a modem by way of RF frequency radio circuits and a mobile terminal 4 comprising another system with plural antennas B1, B2 . . . Bm, linked to another modem by way of RF frequency radio circuits. The emitted signal originates from x antennas chosen from among the N antennas of the base station or the M of the mobile terminal. For this reason each of the reception chains will have available x equalizers used to extract each of the x components of the signal received. The quality of reception depends on good reception of all the components of the signal. A quality indicator conveying the contribution of the reception antennas for the transmission of the stream will be calculated for each of the streams. This criterion is used to ensure that the absence of the selected antenna for a change of sector will not give rise to significant degradations for each of the spatial streams.

It is conceivable moreover as described previously that an antenna initially selected for a chain be disabled for this chain following a unfulfilled selection criterion and that it be reused for the transmission on another reception chain. The criteria envisaged have been described previously.

The modems comprise spatio-temporal coders-decoders making it possible to control in space and time the plurality of antennas.

The MIMO systems comprising antenna diversities with sectorization are combinable with various types of modulation such as for example OFDM modulation.

The invention is not limited to the examples described. Specifically, the number of emission and reception antennas of the base station as of the mobile terminal can be much larger than described in the previous examples. Also, the invention is presented for sectorial antennas but according to the radio system other antennas are conceivable, in particular those offering various possibilities of polarization.

The invention claimed is:

1. Method of positioning antennas in a data transmission system comprising a system combining N antennas (A, B, C) with sectorization (M sectors) wherein, each antenna operating according to a defined sector, the method comprises:

an initialization step consisting in identifying the N antennas concerned, in determining a selection parameter, and in arbitrarily choosing a sector for each of the antennas concerned and a repetitive step of searching, by successive approximations, for the sector of each antenna allowing optimal reception of a signal received, comprising the following steps:

measuring the selection parameter received by each of the N antennas operating according to a given sector, comparing these N parameters and identifying the antenna whose parameter is the lowest, and changing the sector of this antenna, until a maximum level of the parameter received is obtained.

2. Method of positioning antennas according to claim 1, wherein the selection parameter is the power of the signal received.

3. Method of positioning antennas according to claim 1, wherein the selection parameter is the "signal-to-noise" ratio of the signal received.

4. Method of positioning antennas according to claim 1, wherein the step of searching for the sector of each antenna takes place with the dispatch of each new data frame.

5. Method of positioning antennas according to claim 1, wherein a minimum threshold of the selection parameter is fixed so as to be able to deselect the antenna whose selection parameter does not exceed this threshold.

6. Method of positioning antennas according to claim 1, wherein, for a situation defined as stable for an antenna, the recurrence of the step of searching for the sector of each antenna is reduced.

7. Method of positioning antennas according to claim 1, wherein the method applies to any system combining N antennas with different polarizations (M polarizations).

* * * * *